(12) United States Patent
Kitaguchi et al.

(10) Patent No.: US 7,157,716 B2
(45) Date of Patent: Jan. 2, 2007

(54) SEMICONDUCTOR RADIATION DETECTOR AND RADIATION DETECTION APPARATUS

(75) Inventors: Hiroshi Kitaguchi, Naka (JP); Kensuke Amemiya, Hitachinaka (JP); Kazuma Yokoi, Hitachi (JP); Yuuichirou Ueno, Hitachi (JP); Katsutoshi Tsuchiya, Hitachi (JP); Norihito Yanagita, Hitachi (JP); Shinichi Kojima, Hitachi (JP); Keitaro Hitomi, Sendai (JP); Tadayoshi Shoji, Sendai (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 11/045,153

(22) Filed: Jan. 31, 2005

(65) Prior Publication Data

US 2006/0065847 A1   Mar. 30, 2006

(30) Foreign Application Priority Data

Feb. 3, 2004 (JP) ............................. 2004-027091

(51) Int. Cl.
*G01T 1/24* (2006.01)
(52) U.S. Cl. .................... 250/370.12; 257/42
(58) Field of Classification Search ......... 250/370.01, 250/370.05, 370.08, 370.09, 370.11, 370.12; 257/52, 57, 59, 72
See application file for complete search history.

(56) References Cited

U.S. PATENT DOCUMENTS

| 5,206,514 A | * | 4/1993 | Brandner et al. ......... 250/484.4 |
| 5,771,271 A | * | 6/1998 | Iodice ........................ 378/96 |
| 6,399,950 B1 | * | 6/2002 | Kimura et al. ......... 250/370.09 |

(Continued)

FOREIGN PATENT DOCUMENTS

JP       2002-168958       6/2002

OTHER PUBLICATIONS

Hitomi et a, "Thallium Bromide Optical and Radiaiton Detectors for X-and Gamma-Ray Spectroscopy," 2002, pp. 2406-2408.*

(Continued)

*Primary Examiner*—David Porta
*Assistant Examiner*—Faye Boosalis
(74) *Attorney, Agent, or Firm*—Dickstein Shapiro LLP

(57) ABSTRACT

The present invention provides a semiconductor radiation detector and radiation detection apparatus capable of improving energy resolution and the semiconductor radiation detection apparatus includes a semiconductor radiation detector and a signal processing circuit which processes a radiation detection signal output from the semiconductor radiation detector. The semiconductor radiation detector is provided with anode electrodes A and cathode electrodes C disposed so as to face each other with semiconductor radiation detection elements placed in-between. The semiconductor radiation detection element is made up of a single crystal of thallous bromide containing trivalent thallium (e.g., tribromobis thallium). The semiconductor radiation detector containing such a semiconductor radiation detection element reduces lattice defects in the single crystal and thereby increases charge collection efficiency.

12 Claims, 6 Drawing Sheets

U.S. PATENT DOCUMENTS

| | | | |
|---|---|---|---|
| 6,949,750 B1* | 9/2005 | Tsutsui et al. | 250/370.11 |
| 2004/0007169 A1* | 1/2004 | Ohtsu et al. | 117/84 |
| 2004/0251419 A1* | 12/2004 | Nelson et al. | 250/370.09 |
| 2005/0230630 A1* | 10/2005 | Yanagita et al. | 250/370.09 |

OTHER PUBLICATIONS

Adzic et al, "Bromide Adsorption Induced Formation of Thallium Bromide Adlayers with Varying Composition and Structure on the Au(III) Electrode Surface," Aug. 13, 1998, vol. 102, No. 33, p. 6305.*

Hitomi et al, "Characterization of thallium bromide crystals for radiation detector applications," 2001, Journal of Crystal Growth 225, pp. 129-132.*

Oliveira et al, "Purification and Preparation of TlBr Crystals for Room Temperature Radiation Detector Applications," IEEE Transactions on Nuclear Science, Jun. 2004, vol. 51, No. 3, pp. 1224-1227.*

* cited by examiner

SEMICONDUCTOR RADIATION DETECTOR AND RADIATION DETECTION APPARATUS

BACKGROUND OF THE INVENTION

The present invention relates to a semiconductor radiation detector and radiation detection apparatus.

Conventionally, an X-ray machine or radiological imaging apparatus uses a semiconductor radiation detector for detecting radiation such as X-rays which pass through an examinee and γ-rays emitted from a radioactive material given to an examinee. As such a semiconductor radiation detector, one using a semiconductor radiation detection element made of a single crystal of cadmium telluride (CdTe) is known (e.g., see JP-A-2002-168958 (paragraph 0025 and paragraph 0027)). With this semiconductor radiation detector, an attempt is made to increase detection sensitivity of radiation using a single crystal of cadmium telluride with a small content of impurities. Furthermore, JP-A-2002-168958 (paragraph 0025 and paragraph 0027) also describes a semiconductor radiation detection element composed of a polycrystal of thallous bromide (TlBr).

The present inventors created a semiconductor radiation detection element made of a single crystal of high-purity thallous bromide and verified a detection characteristic of radiation by the semiconductor radiation detector using this semiconductor radiation detection element. Based on this verification, the present inventors discovered that this semiconductor radiation detector has a new problem that energy resolution when receiving radiation is extremely poor.

It is an object of the present invention to provide a semiconductor radiation detector and radiation detection apparatus capable of improving energy resolution.

SUMMARY OF THE INVENTION

A feature of the present invention attaining the above described object is the inclusion of a single crystal of thallous bromide containing 80.0 to 99.9 mol % of thallous bromide and 0.1 to 20.0 mol % of trivalent thallium (in terms of tribromobis thallium), a first electrode attached to one surface of this single crystal and a second electrode attached to the other surface of the single crystal, the single crystal being interposed between the first electrode and the second electrode.

The single crystal of thallous bromide improves resistivity of the crystal and can realize a semiconductor radiation detector to which a high voltage is applicable. Furthermore, lattice defects in the single crystal are also decreased. This improves energy resolution and sensitivity.

The single crystal of thallous bromide containing 80.0 to 99.9 mol % of thallous bromide and 0.1 to 20.0 mol % of trivalent thallium (in terms of tribromobis thallium) used in the present invention also includes a single crystal of thallous bromide containing single Br in the above described mol % range in terms of tribromobis thallium in addition to thallous bromide.

Since a single crystal of thallous bromide preferably containing 80.0 to 99.9 mol % of thallous bromide and 0.1 to 20.0 mol % of trivalent thallium (in terms of tribromobis thallium) is used, resistivity is made uniform in a wide area inside the single crystal, lattice defects are further reduced and energy resolution and sensitivity of the semiconductor radiation detector are further improved. The single crystal of thallous bromide containing 80.0 to 99.9 mol % of thallous bromide and 0.1 to 20.0 mol % of trivalent thallium (in terms of tribromobis thallium) also includes a single crystal of thallous bromide containing single Br in this mol % range in terms of tribromobis thallium in addition to thallous bromide.

The present invention improves energy resolution.

Other objects, features and advantages of the invention will become apparent from the following description of the embodiments of the invention taken in conjunction with the accompanying drawings.

DESCRIPTION OF THE EMBODIMENTS

Figure 1:
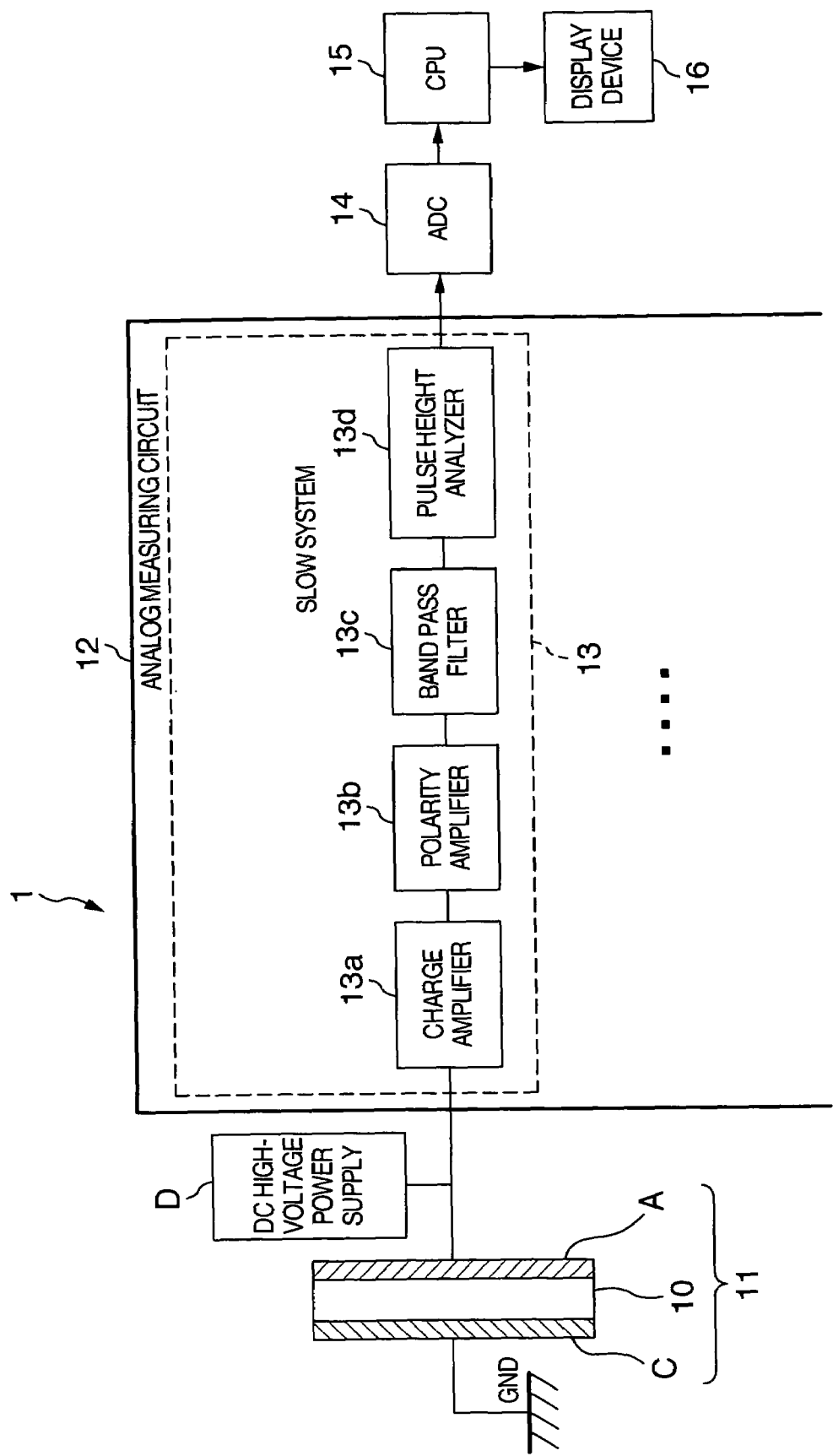
FIG. 1 is a block diagram of a semiconductor radiation detection apparatus according to an embodiment of the present invention.

A radiation detection apparatus which is an embodiment of the present invention will be explained in detail using FIG. 1. The radiation detection apparatus 1 of the present embodiment is an apparatus for detecting radiation such as X-rays and γ-rays, and detection of γ-rays will be explained as an example here. The radiation detection apparatus 1 is provided with a semiconductor radiation detector 11, an analog measuring circuit 12, an analog/digital converter (hereinafter referred to as "ADC") 14 and a central processing unit (hereinafter simply referred to as "CPU") 15. Reference character D denotes a DC high-voltage power supply. The analog measuring circuit 12 can also be constructed of an ASIC (application-specific integrated circuit).

The semiconductor radiation detector 11 is provided with a semiconductor radiation detection element (hereinafter referred to as "semiconductor detection element") 10 and a cathode electrode C and an anode electrode A attached to the semiconductor detection element 10 between which the semiconductor detection element 10 is interposed. The semiconductor detection element 10 is obtained by slicing a single crystal of thallous bromide (hereinafter referred to as "thallium bromide containing trivalent thallium") containing thallous bromide and trivalent thallium manufactured as will be described later and is a tabular body having a rectangular surface. In this embodiment, the semiconductor detection element 10 has a thickness of approximately 0.5 mm. The single crystal of thallium bromide containing trivalent thallium making up the semiconductor detection element 10 contains trivalent thallium (e.g., thallium which makes up tribromobis thallium).

As is publicly known, this trivalent thallium is generated by contacting thallous bromide with bromine and is contained in a single crystal in a mode of not only tribromobis thallium but also thallium (I) salt of 6 parts and 4 parts of bromo-thallium (III) complex radical. Specific examples of matters containing this trivalent thallium include $TlBr_3$, $3TlBr.TlBr_3$, $Tl_3[TlBr_6]$, $TlBr.TlBr_3$ and $Tl[TlBr_4]$, etc. The single crystal of thallium bromide containing trivalent thallium contains thallous bromide and at least one of the above described types of trivalent thallium.

The semiconductor detection element 10 preferably uses a single crystal of thallium bromide containing trivalent thallium containing 80.0 to 99.9 mol % of thallous bromide and 0.1 to 20.0 mol % of trivalent thallium (in terms of tribromobis thallium). The semiconductor detection element 10 using this single crystal of thallium bromide improves resistivity of the single crystal and can realize a semiconductor radiation detector 11 to which a high voltage can be applied. Based on this, energy resolution and sensitivity of the semiconductor radiation detector 11 improve. The melting point of a single crystal of thallium bromide containing trivalent thallium containing 80.0 to 99.9 mol % of thallous bromide and 0.1 to 20.0 mol % of trivalent thallium (in terms of tribromobis thallium) is 150 to 460° C.

The single crystal of thallium bromide preferably contains 85.0 to 99.5 mol % of thallous bromide and 0.5 to 5.0 mol % of trivalent thallium (in terms of tribromobis thallium). Resistivity is made uniform over a wide area in the single crystal and lattice defects are further reduced. This further improves energy resolution and sensitivity of the semiconductor radiation detector 11. The melting point of the single crystal of thallium bromide containing trivalent thallium containing 5.0 to 99.5 mol % of thallous bromide and 0.5 to 5.0 mol % of trivalent thallium (in terms of tribromobis thallium) is 150 to 300° C. The use of a single crystal of thallium bromide containing trivalent thallium containing 99.0 mol % of thallous bromide and 1.0 mol % of trivalent thallium (in terms of tribromobis thallium) is most preferable. In this single crystal, resistivity is most uniform and lattice defects are reduced most. This further improves energy resolution and sensitivity of the semiconductor radiation detector 11. The melting point of a single crystal of thallium bromide containing trivalent thallium having 99.0 mol % of thallous bromide and 1.0 mol % of trivalent thallium (in terms of tribromobis thallium) is 150 to 280° C.

The foregoing explanations have described the single crystal of thallium bromide containing the above described mol % range of trivalent thallium in terms of tribromobis thallium in the single crystal of thallous bromide, but it is also possible to constitute a semiconductor detection element using a single crystal of thallous bromide containing the above described mol % range of single Br in terms of tribromobis thallium in addition to thallous bromide and a semiconductor radiation detector using this semiconductor element can also obtain the above described effects. In the present specification, the single crystal of thallous bromide containing the above described mol % range of single Br in terms of tribromobis thallium in addition to thallous bromide is also referred to as a single crystal of thallium bromide containing trivalent thallium for convenience.

The cathode electrode C is placed on one surface of the semiconductor detection element 10 and the anode electrode A is placed on the opposite surface. The cathode electrode C is grounded and the anode electrode A is connected to a signal processing circuit (signal processing apparatus) 13 provided for an analog measuring circuit 12. The anode electrode A is connected to a DC high-voltage power supply D. The DC high-voltage power supply D applies a voltage of 500 to 800 V for charge collection to the semiconductor detection element 10. For the cathode electrode C and anode electrode A, a highly conductive film such as Pt (platinum), Au (gold) or In (indium) is used.

The analog measuring circuit 12 is provided with the signal processing circuit 13 connected to the semiconductor radiation detector 11 for processing a radiation detection signal output from this semiconductor radiation detector 11. The signal processing circuit 13 is provided with a charge amplifier (pre-amplifier) 13a, a polarity amplifier (linear amplifier) 13b, a band pass filter 13c and a pulse height discriminator circuit (discriminator circuit) 13d for the purpose of calculating peak values of γ-rays based on the radiation detection signal. The charge amplifier 13a, polarity amplifier 13b, band pass filter 13c and pulse height discriminator circuit 13d are connected in that order. The analog measuring circuit 12 includes a plurality of signal processing circuits 13 and these signal processing circuits 13 are connected to different semiconductor radiation detectors 11.

A signal output from the pulse height discriminator circuit 13d of the signal processing circuit 13 is an analog peak value signal and output to the ADC 14. The output of this signal processing circuit 13 is converted to a digital signal by the ADC 14. The ADC 14 outputs the digital signal of the peak value signal to the CPU 15. The CPU 15 receives the digitized peak value signal and counts the peak value signal input for each peak value. The CPU 15 creates information, etc., on a count (count of γ-rays) with respect to the peak value (energy of γ-rays) and stores the count in a storage device (not shown).

Figure 2:
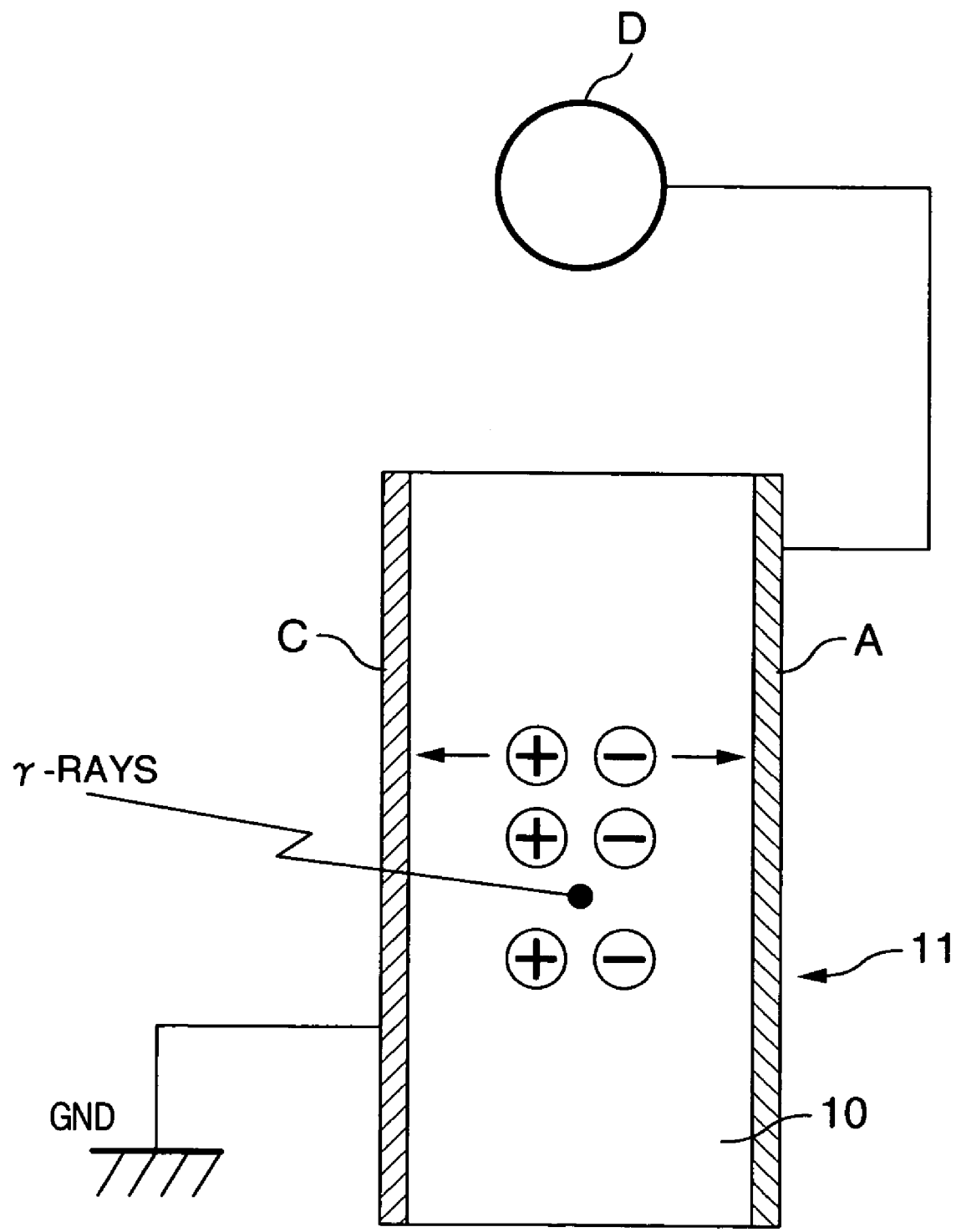
FIG. 2 is a schematic diagram showing γ-rays which have entered the semiconductor radiation detector shown in FIG. 1.

The operation of the semiconductor radiation detection apparatus 1 will be explained with reference to drawings as appropriate. As shown in FIG. 2, when γ-rays enter the semiconductor detection element 10, the semiconductor detection element 10 interacts with γ-rays and generates holes schematically shown with "+" and electrons schematically shown with "−" in the figure. Holes and electrons are generated in pairs. Holes and electrons are generated in numbers proportional to energy of the γ-rays. Since a voltage of 500 to 800 V is applied from the DC high-voltage power supply D between the anode electrode A and cathode electrode C, holes move to the cathode electrode C side and electrons move to the anode electrode A side. The semiconductor radiation detector 11 outputs a radiation detection signal indicating the intensity of energy of the γ-rays which have entered the semiconductor radiation detection element 10 according to the quantity of electrons collected by the anode electrode A, that is, the magnitude of charge. This radiation detection signal is amplified by the charge amplifier 13a and polarity amplifier 13b, passed through the band pass filter 13c and then input to the pulse height discriminator circuit 13d. By analyzing the radiation detection signal which has passed through the band pass filter 13c, the pulse height discriminator circuit 13d generates an analog peak value signal. This analog peak value signal is converted to a digital peak value signal by the ADC 14. This digital peak value signal is output to the CPU 15. The CPU 15 to which this digitized peak value signal is input calculates a peak value indicating the magnitude of energy of the γ-rays received by the semiconductor radiation detection element 10 based on the peak value signal and generates information (e.g., a γ-ray spectral graph shown in FIG. 5) on the count (count of γ-rays) corresponding to the above described peak value (energy of γ-rays). Furthermore, the CPU 15 calculates the intensity of γ-rays (intensity of radiation) based on the count. The information created by the CPU 15 (γ-ray spectral graph, etc.) is displayed on a display device 16 (FIG. 1).

Figure 3:
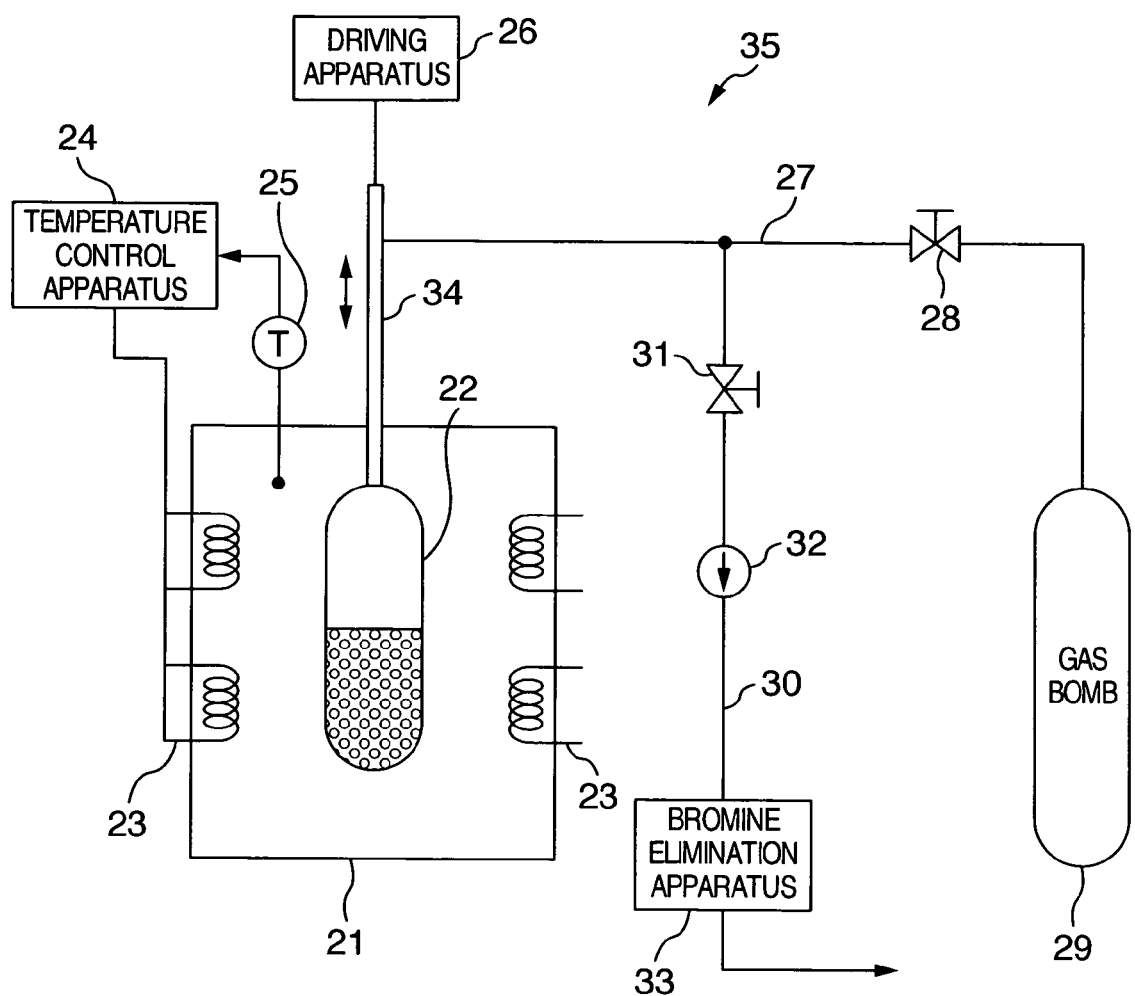
FIG. 3 is a schematic configuration diagram of a manufacturing apparatus for manufacturing a single crystal of thallium bromide containing trivalent thallium used for the semiconductor radiation detection element shown in FIG. 1.
Figure 4:
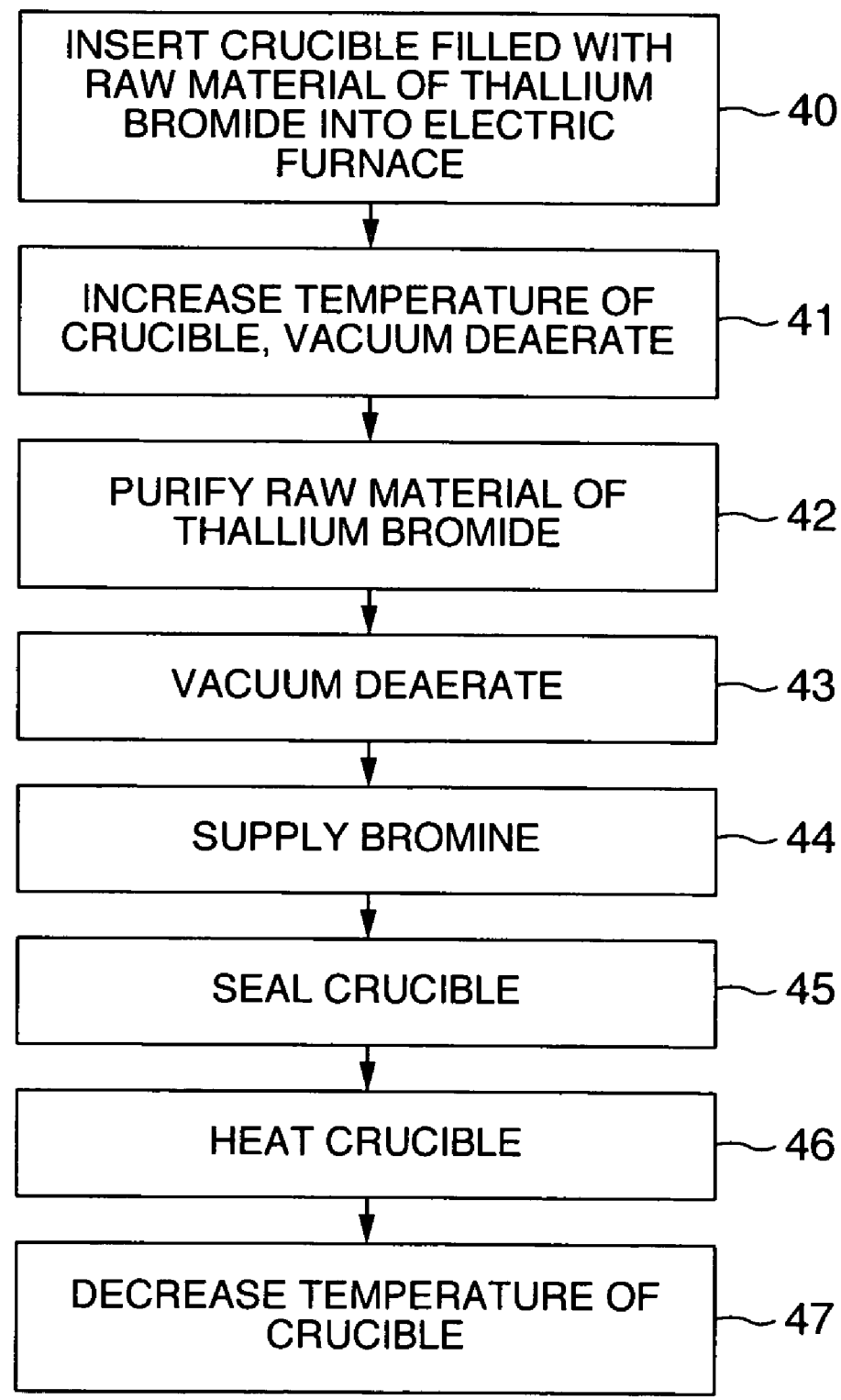
FIG. 4 is a flow chart showing manufacturing steps of the single crystal of thallium bromide containing trivalent thallium using the manufacturing apparatus shown in FIG. 3.

The manufacturing of the single crystal of thallium bromide containing trivalent thallium constituting the semiconductor detection element 10 will be explained with reference to FIG. 3 and FIG. 4.

First, a manufacturing apparatus 35 (FIG. 3) used to manufacture the single crystal of thallium bromide containing trivalent thallium will be explained. The manufacturing apparatus 35 is provided with an electric furnace 21, a driving apparatus 26 which moves a crucible 22 made of heat-resistant glass up and down while rotating it in the electric furnace 21, a gas bomb 29 which supplies a bromine gas into the crucible 22, a vacuum pump 32 and a bromine elimination apparatus 33 which eliminates bromine exhausted from within the crucible 22. The electric furnace 21 is provided with a plurality of electric heaters 23 in the vertical direction and a temperature sensor 25 which measures an internal temperature. The heat values of the respective electric heaters 23 are adjusted under the control of a temperature control apparatus 24 based on the measured value of the temperature sensor 25. A glass tube 34 connected to the crucible 22 is connected to a pipe 27 connected to the gas bomb 29. A valve 28 is set in the pipe 27. A pipe 30 is connected to the pipe 27. A valve 31, the vacuum pump 32 and the bromine elimination apparatus 33 are set in the pipe 30. The gas bomb 29 is filled with a bromine gas.

The manufacturing of the single crystal of thallium bromide containing trivalent thallium using the manufacturing apparatus 35 will be explained using FIG. 4. The crucible 22 filled with a raw material of thallous bromide is inserted into the electric furnace 21 (step 40). The crucible 22 is inserted into the electric furnace 21 using the driving apparatus 26. The valves 28, 31 are closed. In this condition, the temperature of the crucible 22 is increased and the interior of the crucible 22 is vacuum deaerated (step 41). That is, the temperature inside the electric furnace 21 is increased up to 100° C. using the electric heater 23, the valve 31 is opened and the gas in the heated crucible 22 is deaerated by operating the vacuum pump 32. The deaerated gas is passed through the bromine elimination apparatus 33 and exhausted to the outside.

After gas deaeration is completed, the raw material of thallium bromide in the crucible 22 is purified (step 42). This purification is performed by closing the valve 31, opening the valve 28 and charging a bromine gas ($Br_2$ gas) in the gas bomb 29 into the crucible 22. The interior of the electric furnace 21 is kept to a set temperature. A publicly known purification step which can obtain thallous bromide whose melting point is 459° C. is adopted. The completion of the purification step is confirmed when the color of the bromine gas in the crucible 22 is no longer faded.

After the purification step is completed, an enrichment step is performed. The enrichment step corresponds to processes in steps 43 to 45. The interior of the crucible 22 is vacuum deaerated (step 43). The valve 28 is closed, the valve 31 is opened, the vacuum pump 32 is operated and the interior of the crucible 22 is deaerated. When the bromine gas remains in the crucible 22, this bromine gas is eliminated by the bromine elimination apparatus 33 and exhaust to the outside is prevented. After deaeration is completed, the bromine gas is supplied into the crucible 22 (step 44). The bromine gas is supplied by closing the valve 31 and opening the valve 28. The bromine gas is charged from the gas bomb 29 into the crucible 22. After step 44 is completed, the crucible 22 is filled with an amount of bromine gas stoichiometrically determined so that the contents of the purified thallous bromide and trivalent thallium in the single crystal of thallium bromide obtained fall within the above described range. After the bromine gas is charged, the crucible 22 is sealed (step 45). The valves 28, 31 are closed. The crucible 22 is sealed and left standing for a set time. In this set period, thallous bromide is enriched with bromine.

After a lapse of the set time, the crucible 22 is heated (step 46). The crucible 22 is heated by the electric heaters 23 so that the temperature of the crucible 22 in the electric furnace 21 is increased to 500° C. The thallous bromide in the crucible 2 is melted. After heating is completed, the temperature of the crucible 22 is decreased (step 47). That is, the current passed through the electric heaters 23 is adjusted so as to decrease the temperature of the crucible 22 to 150° C. very slowly. For example, the temperature is decreased at a rate of 0.5 to 1.5° C./hour. The temperature is preferably decreased at a rate of 0.5° C./hour. While the temperature of the crucible 22 is decreasing, thallous bromide with bromine added is solidified with the temperature thereof gradually decreasing and the single crystal of thallium bromide containing trivalent thallium (e.g., tribromobis thallium) is let grow. When the content of the crucible 22 is completely solidified, the manufacturing of the single crystal of thallium bromide containing tribromobis thallium ($TlBr_3$) which is trivalent thallium is completed. The content of impurities contained in the manufactured single crystal of thallium bromide was $1 \times 10^{-4}$ wt % or less.

By cutting a single crystal out of the manufactured ingot of the single crystal of thallium bromide containing trivalent thallium and molding the single crystal into a predetermined shape, it is possible to obtain the semiconductor radiation detection element 10. The semiconductor radiation detector 11 is obtained by attaching the anode electrode A and cathode electrode C to this semiconductor detection element 10 as described above.

Using the semiconductor radiation detection apparatus 1 with the semiconductor radiation detector 11, for example, γ-rays emitted from cesium 137 ($^{137}Cs$) as a radiation source were detected. As a result, when the semiconductor radiation detector 11 is used, as shown with a solid line in FIG. 5, a sharp peak of a count of γ-rays appeared at the position of γ-ray energy of 662 keV. Furthermore, a sharp peak of a count of γ-rays also appeared at the position of γ-ray energy of 589 keV adjacent to this peak. The semiconductor radiation detector 11 used to detect the γ-rays used a single crystal of thallium bromide containing 1 mol % of $TlBr_3$.

Figure 5:
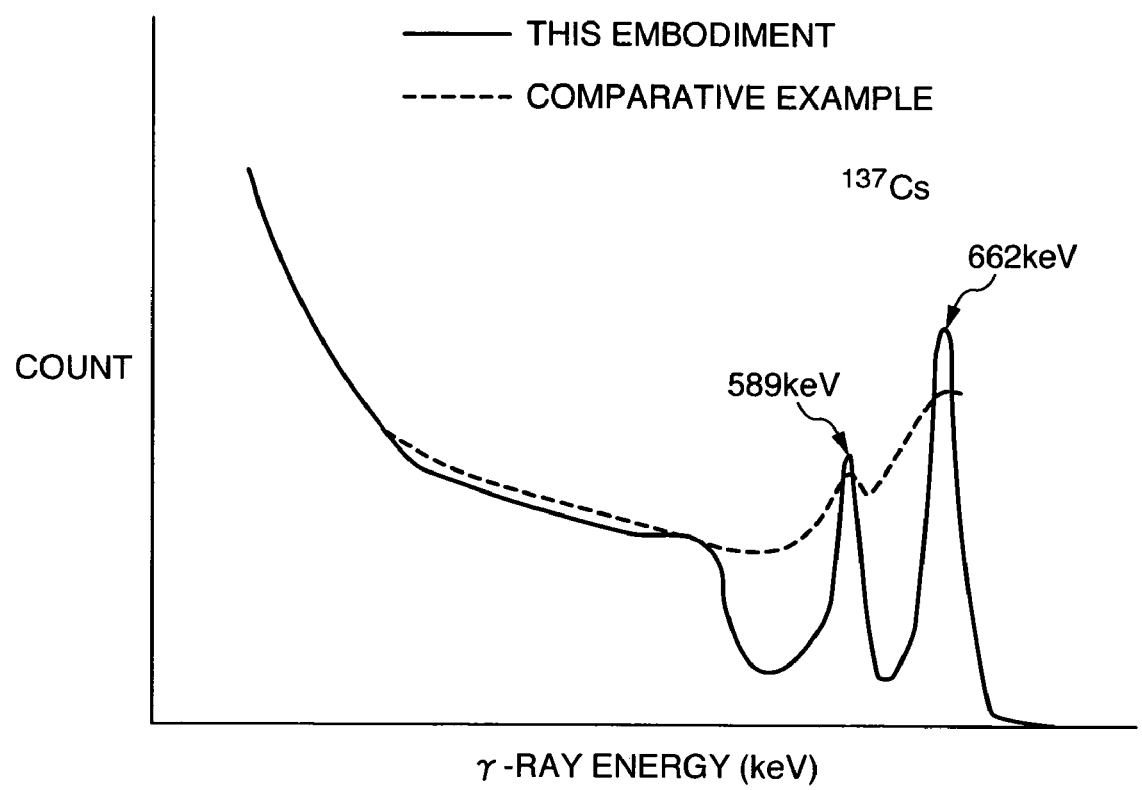
FIG. 5 is a graph showing peaks of γ-ray count detected by the semiconductor radiation detection apparatus shown in FIG. 1 when cesium 137 ($^{137}$Cs) is used as a radiation source and peaks of γ-ray count in a comparative example.

As a comparative example, the result of detecting γ-rays using the semiconductor radiation detector with the single crystal of thallous bromide is shown with a dotted line in FIG. 5. The peaks of counts of γ-rays at the positions of γ-ray energy of both 662 keV and 589 keV detected by this semiconductor radiation detection apparatus are broad and no such sharp peaks as those of the semiconductor radiation detector 11 appear. The single crystal of thallous bromide used for the semiconductor radiation detector in the comparative example does not contain trivalent thallium. Furthermore, this single crystal of thallous bromide contains impurities of $1 \times 10^{-4}$ wt % or more.

The single crystal of thallium bromide containing $TlBr_3$ which is trivalent thallium used for the semiconductor radiation detector 11 of this embodiment has reduced lattice defects in the single crystal compared to the single crystal of thallous bromide used for the semiconductor radiation detector in the comparative example. For this reason, as is evident from FIG. 5, since the semiconductor radiation detection apparatus 1 according to this embodiment uses the semiconductor radiation detector 11 having the semiconductor detection element 10 made up of a single crystal of thallium bromide containing $TlBr_3$, there are fewer lattice defects in the single crystal and it is thereby possible to improve the efficiency of collection of charge generated through absorption of incident γ-rays into the electrodes and further improve energy resolution. Therefore, this semiconductor radiation detection apparatus 1 improves radiation detection performance. The fact that the content of impurities in the single crystal of thallium bromide containing $TlBr_3$ is smaller than the amount of the content in the single crystal of thallous bromide used in the comparative example also contributes to improvement of the efficiency of collection of charge in the semiconductor radiation detector 11 and contributes to improvement of energy resolution of the semiconductor radiation detector 11.

As with the semiconductor radiation detector 11, using a semiconductor radiation detector with a semiconductor detection element made up of a single crystal of thallium bromide containing trivalent thallium of any one of $3TlBr.TlBr_3$, $Tl_3[TlBr_6]$, $TlBr.TlBr_3$ and $Tl[TlBr_4]$ also produces sharp peaks of γ-ray counts at the corresponding γ-ray energy and thereby improves energy resolution.

The explanations so far have described the single crystal of thallium bromide containing trivalent thallium, but similar effects of improving performance are also obtained with a semiconductor detector using a single crystal of thallium bromide containing single Br.

The semiconductor radiation detector 11 according to this embodiment has an excellent withstand voltage characteristic. For example, a bias voltage applicable to the semiconductor radiation detection element 10 having a thickness of 0.5 mm, that is, a semiconductor radiation detector provided with a conventional semiconductor radiation detection element using a single crystal of thallous bromide not containing trivalent thallium is approximately 400 V. In contrast, a bias voltage applicable to the semiconductor radiation detector 11 using the semiconductor radiation detection element 10 is approximately 800 V. The ability to apply a high bias voltage increases the charge collection efficiency of the semiconductor radiation detector 11 and can thereby increase the output of a radiation detection signal.

Furthermore, the semiconductor radiation detection apparatus 1 according to this embodiment using the semiconductor radiation detector 11 containing the semiconductor radiation detection element 10 has an excellent noise characteristic. That is, while the semiconductor radiation detection apparatus provided with a semiconductor radiation detector (having a characteristic shown by a dotted line in FIG. 5) using a conventional semiconductor radiation detection element produces so-called "popcorn noise," the semiconductor radiation detection apparatus 1 according to this embodiment produces no popcorn noise. Therefore, combined with enhancement of the output of a radiation detection signal, the semiconductor radiation detection apparatus 1 greatly improves an S/N ratio of a radiation detection signal. Furthermore, the semiconductor radiation detection apparatus 1 produces no popcorn noise, and thereby eliminates the necessity for a so-called "reset circuit" which cuts off the DC power supply D when popcorn noise exceeding an allowable level occurs, which would be required for the conventional semiconductor radiation detection apparatus.

The above described semiconductor radiation detection apparatus 1 is used to detect γ-rays and other radiation inside or outside facilities handling a radioactive material such as an atomic power plant, nuclear fuel manufacturing plant or nuclear fuel reprocessing plant.

Figure 6:
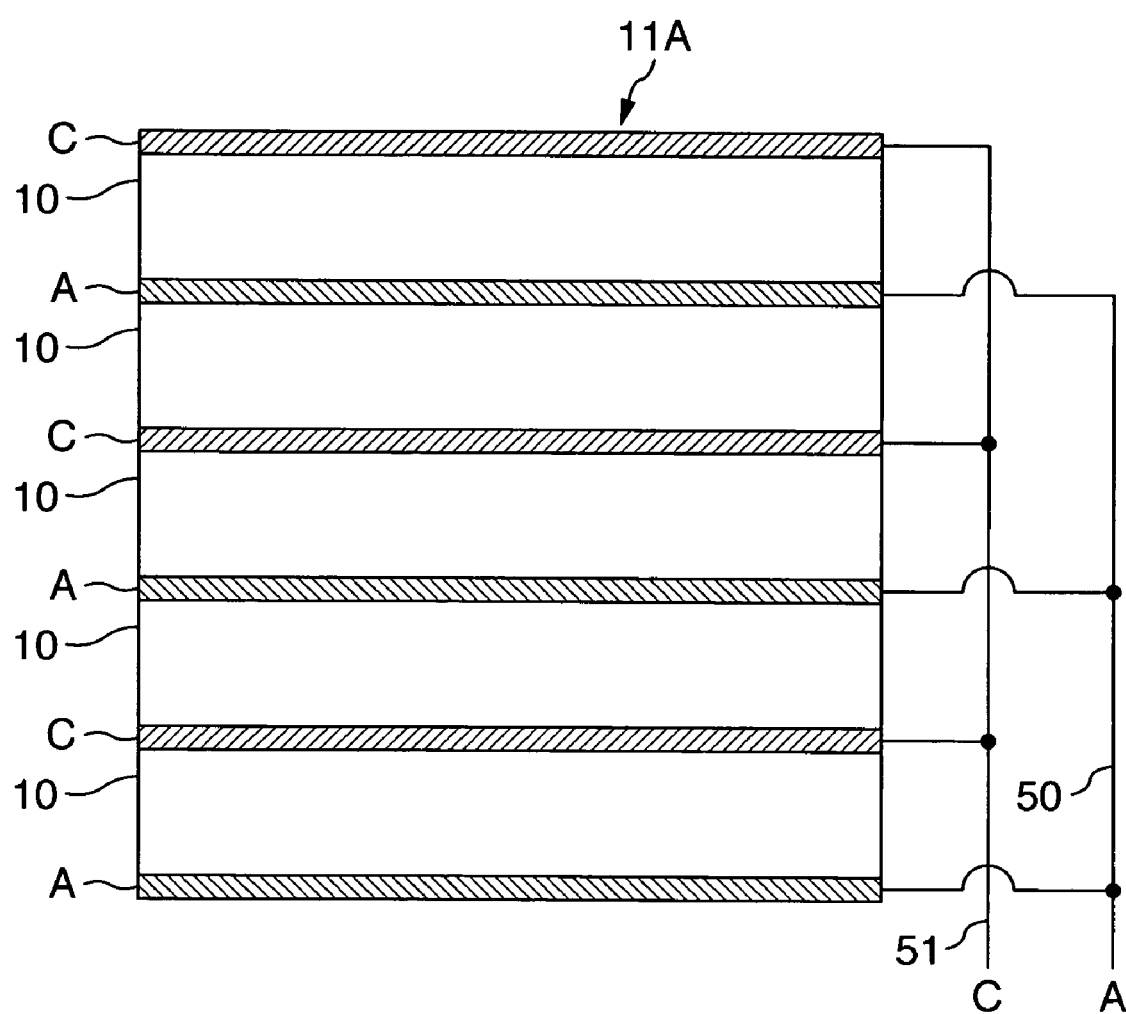
FIG. 6 is a schematic configuration diagram according to another embodiment of the semiconductor radiation detector.

This embodiment of the present invention has been explained so far, but the present invention is not limited to the foregoing embodiment. For example, the semiconductor radiation detection apparatus 1 of the above described embodiment uses the semiconductor radiation detector 11 with the cathode electrode C and anode electrode A attached to one semiconductor radiation detection element 10. However, it is also possible to use a semiconductor radiation detector 11A containing a plurality of semiconductor detection elements 10 shown in FIG. 6 as the semiconductor radiation detector. The semiconductor radiation detector 11A shown in FIG. 6 is provided with five semiconductor detection elements 10 arranged in parallel and arranges cathode electrodes C and anode electrodes A between these semiconductor detection elements 10 alternately. The cathode electrode C disposed between the semiconductor detection elements 10 is attached to one semiconductor detection element 10 adjacent thereto and the other semiconductor detection element 10. The anode electrode A disposed between the semiconductor detection elements 10 is attached to one semiconductor detection element 10 adjacent thereto and the other semiconductor detection element 10. The semiconductor detection element 10 disposed at one end of the semiconductor radiation detector 11A is provided with the cathode electrode C on the surface opposite to the surface on which the anode electrode A is disposed. Furthermore, the semiconductor detection element 10 disposed at the other end of the semiconductor radiation detector 11A is provided with the anode electrode A on the surface opposite to the surface on which the cathode electrode C is disposed. Furthermore, in the semiconductor radiation detector 11A, the respective anode electrodes A are connected to wiring (anode signal line) 50 and the respective cathode electrodes C are connected to wiring (cathode signal line) 51. The wiring 50 is connected to the charge amplifier 13a of the signal processing circuit 13 shown in FIG. 1. The wiring 51 is grounded.

Such a semiconductor radiation detector 11A can obtain the same effect as that of the aforementioned semiconductor detector 11. Furthermore, the semiconductor radiation detector 11A can obtain a higher peak value ascending speed (rise) and a more accurate peak value than the semiconductor radiation detector 11 and can also increase (increase sensitivity) the number (count) of γ-rays that interact with the semiconductor detection element 10.

Furthermore, this embodiment has illustrated the semiconductor radiation detector 11 provided with the tabular shaped semiconductor radiation detection element 10, but the present invention is not limited to this and can also be a semiconductor radiation detector provided with, for example, prism-shaped semiconductor radiation detection elements, anode electrodes A (or cathode electrodes C) disposed so as to penetrate this prism in the height direction and cathode electrodes C (or anode electrodes A) disposed so as to cover the outer surface of the prism.

Furthermore, the semiconductor radiation detectors 11 and 11A may also be insulated and covered with a light-shielding material such as aluminum and an aluminum alloy. The light-shielded semiconductor radiation detectors 11 and 11A have no possibility that the semiconductor radiation detection element 10 may react with light and produce charge.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A semiconductor radiation detector comprising:
   a single crystal of thallium bromide containing 80.0 to 99.9 mol % of thallous bromide and 0.1 to 20.0 mol % of trivalent thallium (in terms of tribromobis thallium);
   a first electrode attached to one surface of said single crystal; and
   a second electrode attached to the other surface of said single crystal, said single crystal being interposed between said first electrode and said second electrode,
   wherein a radiation detection signal is output from one of said single crystal and said second electrode.

2. The semiconductor radiation detector according to claim 1, wherein said single crystal of thallium bromide contains 5.0 to 99.5 mol % of said thallous bromide and 0.5 to 5.0 mol % of said trivalent thallium (in terms of tribromobis thallium).

3. The semiconductor radiation detector according to claim 2, wherein said trivalent thallium is contained as tribromobis thallium.

4. The semiconductor radiation detector according to claim 2, wherein 0.5 to 5.0 mol % of said trivalent thallium in terms of said tribromobis thallium is 0.5 to 5.0 mol % of single Br in terms of said tribromobis thallium.

5. The semiconductor radiation detector according to claim 1, wherein said trivalent thallium is contained as tribromobis thallium.

6. The semiconductor radiation detector according to claim 1, wherein 0.1 to 20.0 mol % of said trivalent thallium in terms of said tribromobis thallium is 0.1 to 20.0 mol % of single Br in terms of said tribromobis thallium.

7. A radiation detection apparatus comprising:
   a semiconductor radiation detector provided with a single crystal of thallium bromide containing 80.0 to 99.9 mol % of thallous bromide and 0.1 to 20.0 mol % of trivalent thallium (in terms of tribromobis thallium), a first electrode attached to one surface of said single crystal and a second electrode attached to the other surface of said single crystal, said single crystal being interposed between said first electrode and said second electrode; and
   a signal processing apparatus which processes a radiation detection signal output from one of said first electrode and said second electrode.

8. The radiation detection apparatus according to claim 7, wherein said single crystal of thallium bromide contains 5.0 to 99.5 mol % of said thallous bromide and contains 0.5 to 5.0 mol % of said trivalent thallium (in terms of tribromobis thallium).

9. The radiation detection apparatus according to claim 8, wherein said trivalent thallium is contained as tribromobis thallium.

10. The radiation detection apparatus according to claim 8, wherein 0.5 to 5.0 mol % of said trivalent thallium in terms of said tribromobis thallium is 0.5 to 5.0 mol % of single Br in terms of said tribromobis thallium.

11. The radiation detection apparatus according to claim 7, wherein said trivalent thallium is contained as tribromobis thallium.

12. The radiation detection apparatus according to claim 7, wherein 0.1 to 20.0 mol % of said trivalent thallium in terms of said tribromobis thallium is 0.1 to 20.0 mol % of single Br in terms of said tribromobis thallium.

* * * * *